（12） United States Patent
Twardochleb et al.

(10) Patent No.: US 9,212,609 B2
(45) Date of Patent: Dec. 15, 2015

(54) COMBINATION AIR ASSIST AND PILOT GASEOUS FUEL CIRCUIT

(71) Applicant: Solar Turbines, Inc., San Diego, CA (US)

(72) Inventors: Christopher Zdzislaw Twardochleb, Alpine, CA (US); Robert Anthony Corr, II, San Diego, CA (US)

(73) Assignee: Solar Turbines Incoporated, San Diego, CA (US)

( * ) Notice: Subject to any disclaimer, the term of this patent is extended or adjusted under 35 U.S.C. 154(b) by 482 days.

(21) Appl. No.: 13/681,909

(22) Filed: Nov. 20, 2012

(65) Prior Publication Data

US 2014/0137565 A1    May 22, 2014

(51) Int. Cl.
| | |
|---|---|
| F23R 3/34 | (2006.01) |
| F23R 3/36 | (2006.01) |
| F23D 17/00 | (2006.01) |
| F02C 9/26 | (2006.01) |
| F02C 9/40 | (2006.01) |
| F02C 3/20 | (2006.01) |
| F02C 7/26 | (2006.01) |
| F23R 3/28 | (2006.01) |

(52) U.S. Cl.
CPC ... *F02C 9/40* (2013.01); *F02C 3/20* (2013.01); *F02C 7/26* (2013.01); *F02C 9/263* (2013.01); *F23D 17/002* (2013.01); *F23R 3/343* (2013.01); *F23R 3/36* (2013.01); *F05D 2260/85* (2013.01); *F23R 3/286* (2013.01)

(58) Field of Classification Search
CPC ............ F23R 3/286; F23R 3/343; F23R 3/36; F23D 17/002; F02C 9/28; F02C 9/263
USPC ......................................................... 60/776
See application file for complete search history.

(56) References Cited

U.S. PATENT DOCUMENTS

| | | | | |
|---|---|---|---|---|
| 3,866,413 | A | * | 2/1975 | Sturgess ........................... 60/742 |
| 4,006,589 | A | * | 2/1977 | Schirmer ......................... 60/748 |
| 4,168,803 | A | * | 9/1979 | Simmons et al. .............. 239/400 |
| 4,311,277 | A | | 1/1982 | Stratton |
| 4,375,952 | A | * | 3/1983 | Vosper et al. .................. 431/171 |
| 4,385,490 | A | * | 5/1983 | Schirmer et al. ............. 60/39.23 |
| 4,557,241 | A | * | 12/1985 | Kawachi et al. .............. 123/585 |
| 4,726,192 | A | | 2/1988 | Willis et al. |
| 4,766,721 | A | * | 8/1988 | Iizuka et al. ................. 60/39.23 |
| 6,532,726 | B2 | | 3/2003 | Norster et al. |
| 8,099,940 | B2 | | 1/2012 | Twardochleb et al. |
| 2003/0101729 | A1 | * | 6/2003 | Srinivasan ...................... 60/776 |
| 2007/0271927 | A1 | * | 11/2007 | Myers et al. .................... 60/776 |
| 2009/0113893 | A1 | * | 5/2009 | Li et al. ........................... 60/737 |
| 2010/0154424 | A1 | * | 6/2010 | Twardochleb et al. ......... 60/740 |
| 2012/0111016 | A1 | * | 5/2012 | Lockyer et al. ................. 60/772 |
| 2012/0324900 | A1 | * | 12/2012 | Twardochleb et al. ......... 60/772 |
| 2013/0283809 | A1 | * | 10/2013 | Twardochleb et al. ......... 60/772 |

\* cited by examiner

*Primary Examiner* — Phutthiwat Wongwian
*Assistant Examiner* — Rene Ford
(74) *Attorney, Agent, or Firm* — Finnegan, Henderson, Farabow, Garrett & Dunner, LLP

(57) ABSTRACT

When starting a dual fuel turbine engine on liquid fuel, a flow of air assist into a combined pilot gaseous fuel and air assist tube is supplied. The velocity of the flow of air assist is increased as it is expelled through an outlet of the tube. The flow of air assist is directed into a first end of a pilot injector barrel. Additional air is drawn into the first end of the pilot injector barrel from an enclosure containing both the first end of the pilot injector barrel and the tube outlet. Liquid pilot fuel is supplied at a second end of the pilot injector barrel, and this fuel is atomized by the flow of the air assist and additional air. The atomized pilot liquid fuel may then be combusted.

9 Claims, 4 Drawing Sheets

COMBINATION AIR ASSIST AND PILOT GASEOUS FUEL CIRCUIT

TECHNICAL FIELD

The present disclosure relates generally to a dual fuel injector, and more particularly, to a dual fuel turbine injector with a combined pilot gaseous fuel and air assist circuit.

BACKGROUND

Gas turbine engines (GTEs) produce power by extracting energy from a flow of hot gas produced by combustion of fuel in a stream of compressed air. In general, GTEs have an upstream air compressor coupled to a downstream turbine, with a combustion chamber (combustor) in between. The flow of hot gas is produced when a mixture of compressed air and fuel is burned in the combustor, In typical GTEs, multiple fuel injectors direct the fuel to the combustor for combustion.

Combustion of typical fuels results in the production of some undesirable constituents, such as $NO_x$, in GTE. exhaust emissions. Air pollution concerns have led to government regulations that limit the emission of $NO_x$ in GTE exhaust, One method used to reduce $NO_x$ emissions of GTEs is to use a well-mixed lean fuel-air mixture (a fuel-air mixture having a lower fuel to air ratio than the stoichiometric ratio) for combustion in the combustor. However, in some cases, using a lean fuel-air mixture may make combustion unstable. To provide a stable flame while meeting $NO_x$ emission regulations, some fuel injectors direct separate streams of a lean fuel-air mixture and a relatively richer fuel-air mixture to the combustor. The lean fuel-air mixture may provide low $NO_x$ emissions, while the richer fuel-air mixture may provide flame stabilization.

In some cases, the fuel injector may also be configured to direct both a liquid and a gaseous fuel to the combustor. Such a fuel injector, called a dual fuel injector, may enable the GTE to operate using both liquid fuel (such as, for example, diesel) and gaseous fuel (such as, for example, natural gas), depending upon the conditions and economics of any particular GTE operating site. In dual fuel injectors, the liquid or the gaseous fuel may be directed to the fuel injector, mixed with air, and delivered to the combustor. Such a dual fuel injector may include both liquid fuel supply lines and gaseous fuel supply lines, along with suitable valves that enable the liquid fuel supply to the injector to be switched off while the GTE is operating on gaseous fuel, and the gaseous fuel supply to the injector to be switched off while the GTE is operating on liquid fuel. That is, a GTE's dual fuel injectors selectively direct either gas or liquid fuel to the combustor at any time.

U.S. Pat. No. 8,099,940 B2 ('940 patent) to Twardochieb et al, (issued Jan. 24, 2012) discloses a dual fuel injector for a gas turbine engine that includes both a main fuel stream and a pilot fuel stream. The pilot fuel stream includes a fuel-air mixture that is richer in fuel relative to the main fuel stream. The lean fuel-air mixture directed into a combustor burns to produce a low temperature flame, The $NO_x$ emissions of the GTE operating on the lean fuel-air mixture is low. The richer fuel-air mixture, directed to the combustor as the pilot fuel stream, burns at a higher temperature and serves to stabilize the combustion process at the cost of slightly increased $NO_x$ emissions. To reduce $NO_x$ emissions while maintaining the stability of the combustion process, a control system of the GTE increases the flow of pilot fuel-air mixture during startup or when an unstable combustion event is detected. The '940 patent further discloses that a dual fuel injector may comprise an air assist circuit terminating in an air assist nozzle, which supplies externally pressurized air while the GTE is starting on liquid fuel. Whereas a running GTE may utilize compressed air generated by the GTE's compressor to obtain a suitable air-liquid fuel mixture for the pilot, such compressed air may not be available during GTE startup. Thus, during GTE startup, air assist provided by the air assist circuit may be advantageously used to atomize (or improve atomization of) the liquid fuel in the pilot fuel stream, and thereby create (or improve) the rich fuel air mixture directed into the combustor by the pilot. It may be noted that the externally-pressurized air assist is of much lower pressure than the compressed air normally generated by the GTE's compressor.

When a GTE runs on gaseous fuel, it is somewhat typical that the flows of pilot gaseous fuel from respective dual fuel injectors will differ due to variations in manufacture (within manufacturing tolerances). This variability of pilot gaseous fuel flows can cause inefficient combustion of the pilot (and main) gaseous fuel, resulting in excessive $NO_x$ emissions or engine knock. It is known in the art that restricting the pilot gaseous fuel flow from each respective dual fuel injector substantially reduces the variability in the respective gaseous fuel flows. This is typically accomplished by, for example, placing a restrictor, such as an orifice or a restricting nozzle, at the end of the pilot gaseous fuel line. Additionally, a restriction—such as an orifice—placed at the end of the pilot gaseous fuel line may serve to prevent the flow of fuel or combustion byproducts into the pilot gaseous fuel line when the pilot gaseous fuel line is not in use. Although the magnitude of restriction need not be large to reduce the variability of pilot gaseous fuel flows among respective fuel injectors, the restriction necessarily results in a pressure drop.

Although the inclusion of air assist circuits may improve performance of a GTE, the air assist circuits disclosed in the '940 patent can also be problematic. In particular, their inclusion may complicate the design, manufacture, and maintenance of a GTE, resulting in additional labor and material costs. Moreover, inclusion of air assist circuits can present a risk that fuel or byproducts of fuel combustion, such as sulfur residue, may flow into the air assist circuit assembly when air assist is not being used. That is, the pressures generated by combustion or by fuel injection may cause an undesirable reverse flow of fuel or combustion byproducts to enter the air assist circuit, The presence of fuel or combustion byproducts in the air assist assembly may clog or corrode the air assist assembly, undermining safe, efficient operation of a dual fuel injector.

The disclosed dual fuel injector is director toward overcoming one or more of the problems set forth above and/or other problems of the prior art.

SUMMARY OF THE DISCLOSURE

In one aspect, a method for starting a dual fuel turbine engine on liquid fuel is disclosed. The method includes supplying a flow of air assist into a combined pilot gaseous fuel and air assist tube. The velocity of the flow of air assist is increased as it is expelled through an outlet of the tube. The flow of air assist is directed into a first end of a pilot injector barrel. Additional air is drawn into the first end of the pilot injector barrel from an enclosure containing both the first end of the pilot injector barrel and the tube outlet. Liquid pilot fuel is supplied at a second end of the pilot injector barrel, and this fuel is atomized by the flow of the air assist and additional air. The atomized pilot liquid fuel may then be combusted.

In another aspect a fuel injector is disclosed. The fuel injector includes a pilot injector barrel; a combined pilot gaseous fuel and air assist circuit, which terminates in a restricting outlet; and a pilot liquid fuel circuit. The combined pilot gaseous fuel and air assist circuit is configured to direct fluid into a first end of the pilot injector barrel, and its restricting outlet is positioned to draw additional gas into the first end of the pilot injector barrel from an enclosure containing the restricting outlet and the first end of the pilot injector barrel. The pilot liquid fuel circuit is configured to distribute pilot liquid fuel at a second end of the pilot injector barrel.

In yet another aspect, a turbine engine is disclosed. The turbine engine includes a combined pilot gaseous fuel and air assist manifold, an air assist source coupled to the combined pilot gaseous fuel and air assist manifold, a pilot gaseous fuel source coupled to the combined pilot gaseous fuel and air assist manifold, a compressor system, an enclosure into which the compressor system may discharge compressed air, and a plurality of fuel injectors. Each fuel injector includes a pilot injector barrel, a combined pilot gaseous fuel and air assist tube, and a pilot liquid fuel circuit, The combined pilot gaseous fuel and air assist tube is connected to the combined pilot gaseous fuel and air assist manifold and terminates in a restricting outlet. The combined pilot gaseous fuel and air assist tube is configured to direct fluid into a first end of the pilot injector barrel, and its restricting outlet is positioned to draw additional gas from the enclosure into the first end of the pilot injector barrel. The pilot liquid fuel circuit is configured to distribute pilot liquid fuel at a second end of the pilot injector barrel.

DETAILED DESCRIPTION

Figure 1:
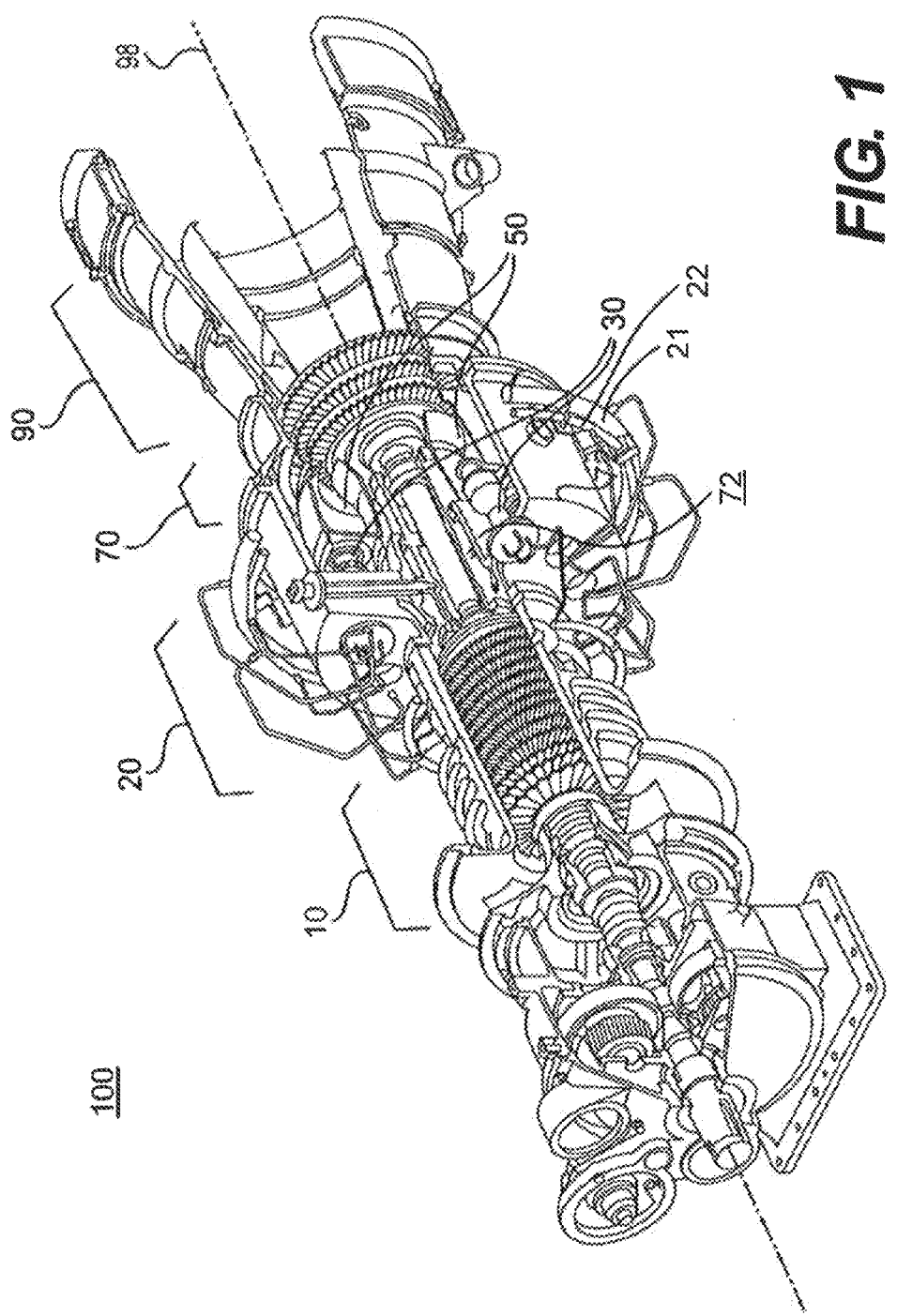
FIG. 1 is a pictorial view of an exemplary disclosed GTE system.

FIG. 1 illustrates an exemplary GTE 100, GTE 100 may have, among other systems, a compressor system 10, one or more of a combustor system 20, a turbine system 70, and an exhaust system 90 arranged along an engine axis 98. Compressor system 10 may compress air to a discharge pressure and deliver the compressed air to an enclosure 72 of combustor system 20. The compressed air may then be directed from enclosure 72 into one or more fuel injectors 30 positioned therein. The compressed air may be mixed with a fuel in fuel injector 30, and the mixture may be directed to a combustor 50. The fuel-air mixture may ignite and burn in combustor 50 to produce combustion gases at an elevated temperature and pressure. These combustion gases may be directed to turbine system 70. Turbine system 70 may extract energy from these combustion gases and direct the exhaust gases to the atmosphere through exhaust system 90. The layout of GTE 100 illustrated in FIG. 1, and described above, is only exemplary and fuel injectors 30 of the current disclosure may be used with any configuration and layout of GTE 100.

GTE 100 may comprise two gas manifolds: a main gaseous fuel manifold 21 and a combination pilot gaseous fuel/air assist manifold 22. Main liquid fuel and pilot liquid fuel may be supplied via respective distribution blocks (not indicated) adjacent to GTE 100.

Figure 2:
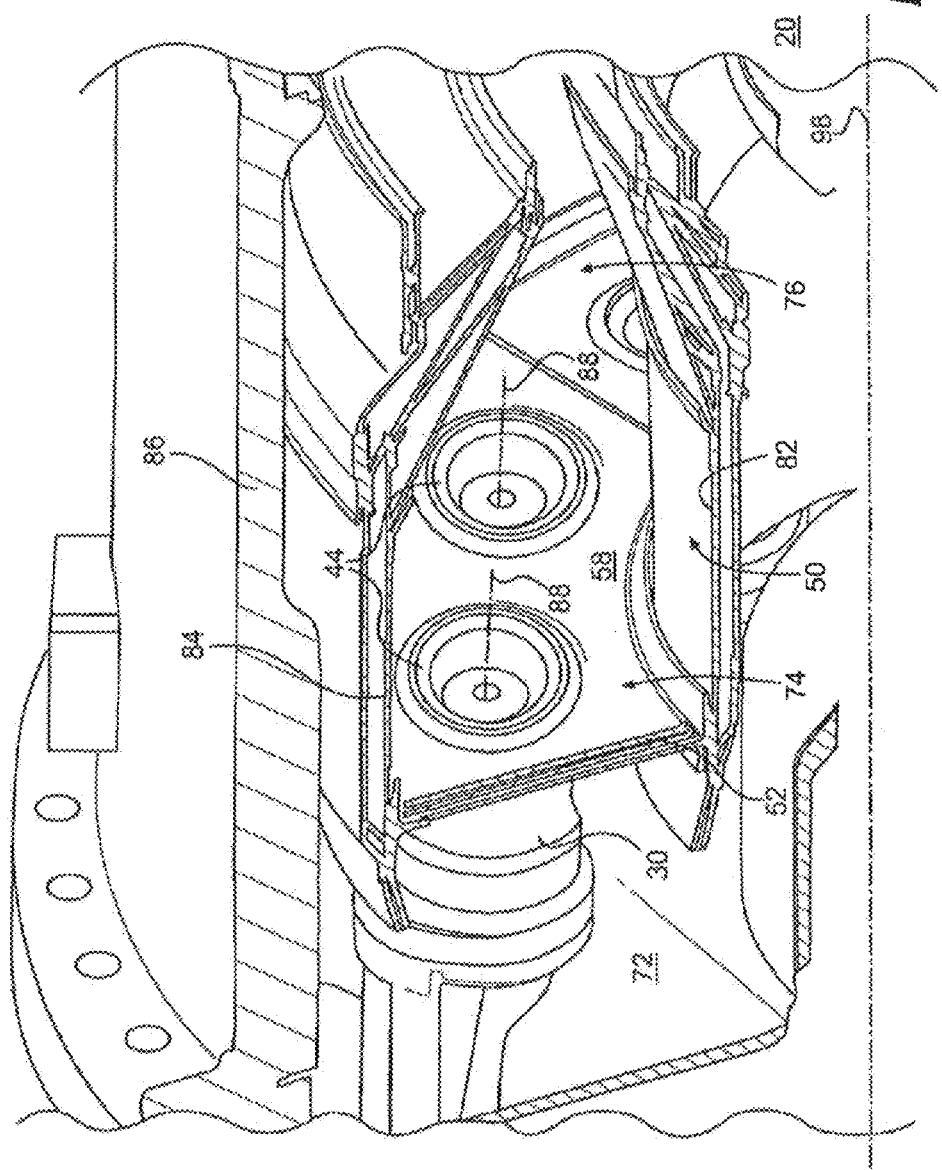
FIG. 2 is a cut-away view of the combustor of the GTE system of FIG. 1.

FIG. 2 is a cut-away view of combustor system 20 showing a plurality of fuel injectors 30 fluidly coupled to combustor 50. Combustor 50 may be positioned within an outer casing 86 of combustor system 20, and may be annularly disposed about engine axis 98. Outer casing 86 and combustor 50 may at least partially define the enclosure 72 between them. As indicated earlier, enclosure 72 may contain compressed air at compressor discharge pressure. Combustor 50 may include an inner liner 82 and an outer liner 84 joined at an upstream end 74 by a dome assembly 52. Inner liner 82 and outer liner 84 may define a combustor volume 58 between them. Combustor volume 58 may be an annular space bounded by inner liner 82 and outer liner 84 that extends from upstream end 74 to a downstream end 76, along engine axis 98. Combustor volume 58 may be fluidly coupled to turbine system 70 (not shown) at the downstream end 76. Fuel injectors 30 may be positioned on dome assembly 52 symmetrically about engine axis 98, such that a longitudinal axis 88 of each fuel injector 30 may be substantially parallel to engine axis 98. A first end 44 of each fuel injector 30 may couple the fuel injector 30 to combustor volume 58. Although the embodiment of FIG. 1 and FIG. 2 (which only depicts a portion of the combustor system 20) includes twelve fuel injectors 30, in general, the number of fuel injectors 30 positioned on dome assembly 52 may depend upon the application.

Figure 3:
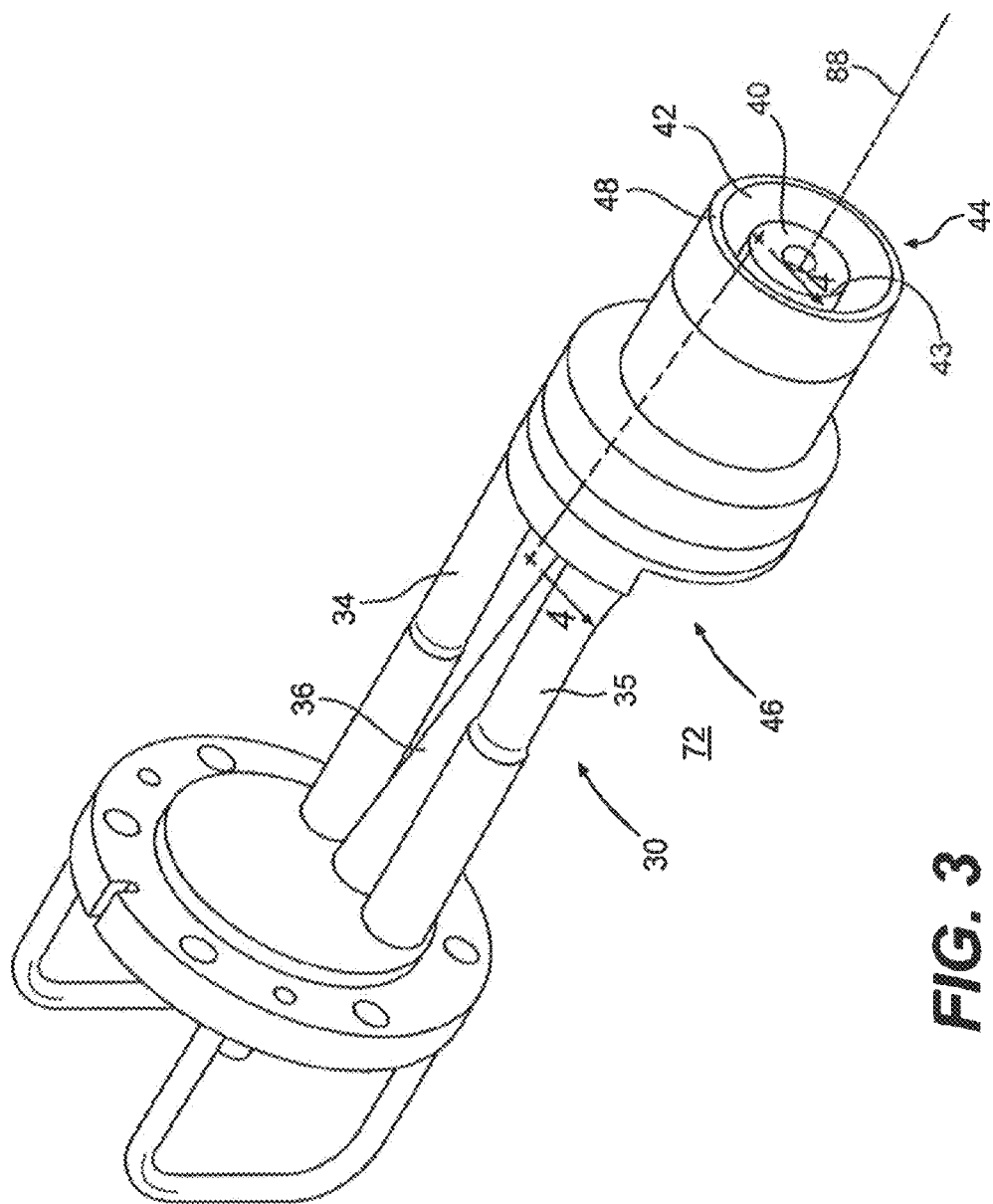
FIG. 3 is a pictorial illustration of a fuel injector of the GTE of FIG. 1.

FIG. 3 is an illustration of an exemplary embodiment of fuel injector 30. Fuel and compressed air may be delivered to fuel injector 30 through a second end 46. This fuel and air may be mixed together and directed to combustor 50 (not shown) through first end 44. And the fuel/air mixture may include, a pilot mixture and a separate main mixture. The pilot fuel-air mixture may be directed to combustor 50 through a pilot assembly 40 centrally located on fuel injector 30. Fuel injector 30 may also include a tubular premix barrel 48 circumferentially disposed about a housing 43 of pilot assembly 40. The main fuel-air mixture may be directed to combustor 50 through an annular duct 42 disposed between pilot assembly housing 40 and premix barrel 48.

Fuel injector 30 may be a dual fuel injector configured to selectively deliver a gaseous fuel or a liquid fuel to combustor 50. The fuel delivered to fuel injector 30 may be switched between a gaseous fuel and a liquid fuel to suit the operating conditions of GTE 100. For instance, at an operating site with an Abundant supply of natural gas, fuel injector 30 may at times deliver liquid fuel to combustor 50 and at other times switch to natural gas fuel to utilize the locally available fuel supply. To accommodate the delivery of both liquid and gaseous fuels to combustor 50, pilot assembly 40 and annular duct 42 may include both liquid and gaseous fuel delivery systems.

A pilot delivery strut 36 may deliver pilot gaseous fuel, main gaseous fuel, and air assist to second end 46 of fuel injector 30. Air assist comprises externally-pressurized air that may be utilized in atomizing pilot liquid fuel for combustion during GTE startup. When the GTE runs (or is starting up) on gaseous fuel, the pilot fuel stream comprises pilot gaseous fuel and the main fuel stream comprises main gaseous fuel. A liquid fuel line 34 and a gaseous fuel line 35 may deliver main liquid and main gaseous fuel to second end 46 of fuel injector 30. The pilot liquid fuel, pilot gaseous fuel, and air assist may be directed to pilot assembly 40 to form the pilot fuel-air mixture directed to combustor 50 through first end 44. The main liquid fuel and main gaseous fuel may be directed to annular duct 42 to form the main fuel-air mixture directed to combustor 50 through first end 44.

Figure 4:
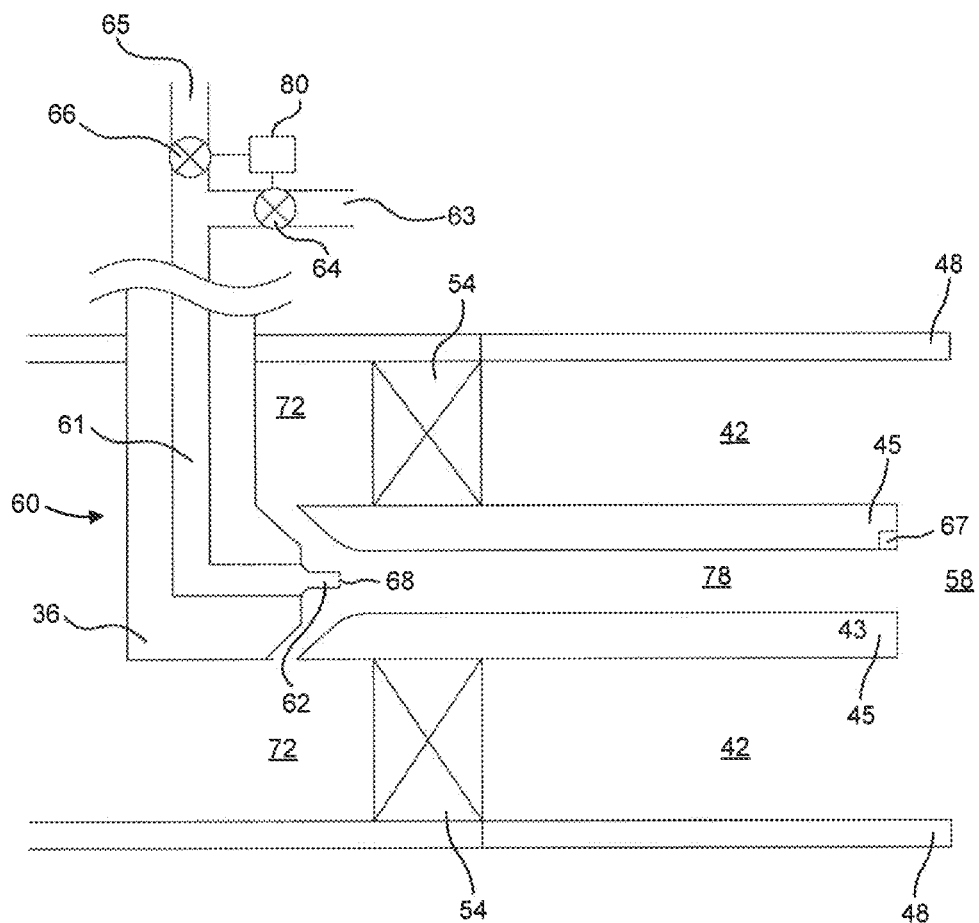
FIG. 4 is a partial schematic of the dual fuel injector of FIG. 3.

FIG. 4 is a partial schematic view of dual fuel injector 30, further depicting structures used to supply pilot gaseous fuel and air assist to combustor 50 via combined pilot gaseous fuel and air assist circuit 60. For the purpose of illustration, certain components of fuel injector 30 are omitted from the schematic, including liquid fuel lines 34 and main gaseous fuel lines 35.

Combined pilot gaseous fuel and air assist tube 61 within pilot delivery strut 36 alternatively delivers air assist or pilot gaseous fuel through a restricting outlet, e.g., nozzle 62 and/or orifice 68, into pilot longitudinal passageway 78 enclosed by pilot injector barrel 45. A pilot gaseous fuel source 65 may supply combined pilot gaseous fuel and air assist tube 61 (via a combined pilot gaseous fuel and air assist manifold 22) with gaseous fuel when a pilot gaseous fuel valve 66 is open. This may occur when GTE 100 is running on or starting on gaseous fuel. An air assist source 63 may supply combined pilot gaseous fuel and air assist tube 61 (via a combined pilot gaseous fuel and air assist manifold 22) with air assist (often regulated shop air) when air assist valve 64 is open. The shop air may be regulated such that air assist is supplied to the manifold 22 at a certain pressure above the compressor discharge pressure (e.g., the pressure within enclosure 72), for example 30 PSI. This may occur when GTE 100 is starting on liquid fuel. It is contemplated that valves 64 and 66, as well as sources 63 and 65, may be located external to GTE 100, Valves 64 and 66 may be controlled by the system controller 80 of GTE 100, utilizing appropriate logic to isolate pilot gaseous fuel source 65 from air assist source 63. In some embodiments, air assist valve 64 may further regulate the flow and pressure of air assist to be delivered. Furthermore, the gaseous fuel and air assist supply system of GTE 100 may include pressure transducers (not shown) monitored by the system controller 80 to detect for any malfunctions in the system. When GTE 100 runs on gaseous fuel, combined pilot gaseous fuel and air assist circuit 60 may supply pilot gaseous fuel to fuel injector 30 via combined pilot gaseous fuel and air assist tube 61. When GTE 100 is starting up on liquid fuel, combined pilot gaseous fuel and air assist circuit 60 may supply air assist to fuel injector 30 via combined pilot gaseous fuel and air assist tube 61. And, when GTE 100 is running on liquid fuel, it is contemplated that combined pilot gaseous fuel and air assist circuit 60 may not supply any fluid to fuel injector 30. When GTE 100 runs on liquid fuel, pilot liquid fuel may be distributed at a pilot liquid fuel nozzle 67, which may be located at the end of pilot injector barrel 45.

Orifice 68 may serve to reduce variability in the how of pilot gaseous fuel from respective fuel injectors 30, thereby improving GTE performance. Further, orifice 68 may serve to inhibit a backflow of fuel or combustion byproducts into combined pilot gaseous fuel and air assist circuit 60 when fuel injector GTE 100 is running on liquid fuel (e.g., when neither pilot gaseous fuel nor air assist flow from combined pilot gaseous fuel and air assist tube 61, which may otherwise prevent backflow).

Additional exemplary embodiments may include structures configured to cause an ejector effect via the flow of air assist, which may compensate for a decline in pressure and flow caused by orifice 68. The ejector effect involves using a motive fluid (e.g. air assist) to draw in entrained suction fluid (e.g., uncompressed air within enclosure 72) by way of the Venturi effect to create a fluid flow greater than that of the motive fluid. For example, nozzle 62 may be placed, at least partially, within passageway 78. And, the nozzle 62 may be exposed, at least partially, to compressed air enclosure 72. The ejector effect concept is well know by persons of skill in the art, and the spatial relationship between the structural components causing the ejector effect may be determined according to known methods based upon, among other things, the ratio between the desired gas pressure and the orifice area. To the extent that GTE 100 utilizes a restrictor, such as orifice 68, at the end of tube 61 (or elsewhere in the pilot assembly or manifold 22) to reduce variability in flow of the pilot gaseous fuel, air assist flow may be insufficient without the ejector effect. That is, without the ejector effect, the further pressure drop caused by that variability-reducing restrictor may reduce the air assist flow to the point that it can no longer effectively atomize pilot liquid fuel on startup.

In other embodiments, orifice 68 may not be included as part of combined pilot gaseous fuel and air assist circuit 60. Lacking orifice 68 or another restrictor, pilot gaseous fuel flowing through tube 61 may not undergo a pressure drop due to restriction. In such embodiments, the ejector effect may not be necessary and structures to create such an effect may be omitted. Further, the ejector effect may not be possible without suction created by orifice 68 or another element that increases air flow velocity. In the context of the ejector effect, air within enclosure 72 may be drawn in by a suction effectively caused by the high-velocity flow of air assist exiting nozzle 62, and this high velocity flow may he the result of air assist being forced through the constricted cross-sectional area of orifice 68. Without the air assist being forced through a constricted cross-sectional area, the air assist flow may not be of sufficiently high velocity to create an ejector effect. However, it should be noted that the omission of the orifice 68 may increase $NO_x$ emissions and may increase the likelihood of engine knock resulting from combustion that is not evenly distributed throughout combustion chamber 58.

Also depicted in FIG. 4 is an air swirler 54, including one or more vanes (not shown) used to agitate air from enclosure 72 to facilitate creation of the main fuel-air mixture. Main gaseous fuel may be supplied through holes (not shown) in a leading edge of one or more vanes in air swirler 54. Main liquid fuel may he supplied through fuel injection spokes (not shown) on the side of one or more vanes closest to combustion chamber 48. The mixed main fuel-air mixture (liquid or gas) may he distributed to combustion chamber 58 through annular duct 42 after passing through air swirler 54.

In yet other embodiments, the ejector effect may operate using "air" assist that is not, in fact, air. That is, the ejector effect may be sufficiently caused using other fluids—i.e., liquids or gases. In other words, the flow of these other fluids through the orifice may, by means of the ejector effect, draw in sufficient air to effectively atomize pilot liquid fuel.

Industrial Applicability

The presently disclosed fuel injector and/or GTE system may be utilized to facilitate startup of a gas turbine engine. The disclosed fuel injector and/or GTE system may facilitate startup by providing air assist to atomize liquid pilot fuel, and thereby improving combustibility. The air assist may be used to used to atomize the pilot liquid fuel during startup. The disclosed fuel injector and/or GTE system may also create an ejector effect, thereby increasing the flow of air to atomize pilot liquid fuel and further permitting a restriction on the combination air assist/pilot gaseous fuel circuit.

During typical GTE operation, a fuel-air mixture may be directed to combustor volume 58 through first end 44 of each fuel injector 30. Upon entry into combustor volume 58, this fuel-air mixture may ignite and create a plume of flame proximate to upstream end 74 of combustor volume 58 (and first end 44 of fuel injector 30). Combustion of the fuel-air mixture may create combustion gases at an elevated temperature and pressure. These combustion gases may be directed to turbine system 70 through an opening at the downstream end 76 of combustor 50. Variations in the fuel-air mixture (variations in volume, concentration of fuel, etc.) directed to combustor volume 58 by different fuel injectors 30 (and possibly other factors), may cause variations in the intensity of the flame produced at the mouth of different fuel injectors 30.

When starting up on liquid fuel, GTE 100 may initially be powered by a starter engine (not shown). At approximately 20% of its rated load speed (the speed at which a GTE can drive its full intended load), the flow of the pilot liquid fuel and air assist may be initiated. At this time, the air within enclosure 72, which may be compressed by compression section 10 when GTE is running, likely does not have sufficient flow to effectively atomize the liquid pilot fuel. Valve 64 may be opened, which permits air assist from air assist source 63 to flow through combination pilot gaseous fuel/air assist manifold 22 and into combined pilot gaseous fuel and air assist tube 61 of dual fuel injector 30. The air assist flows into and is expelled from nozzle 62 and orifice 68, which may reduce the cross-sectional area through which the air assist may flow. As such, the velocity of the air assist flow expelled from nozzle 62 and orifice 68 is greater than the air assist flow within combined pilot gaseous fuel and air assist tube 61. The air assist flow is then directed into the first end of the pilot injector barrel 45, which encloses pilot longitudinal passageway 78 enclosed. Further, due to the ejector effect, the increased velocity of the air assist expelled through orifice 68 reduces the surrounding static pressure, effectively creating a suction that draws additional air from enclosure 72 into passageway 78. Thus, the flow of air in passageway 78 may be greater than the flow of air assist expelled from orifice 68 of nozzle 62.

The air flowing through passageway 78 effectively atomizes pilot liquid fuel expelled from pilot liquid fuel nozzle 67, despite the pressure drop caused by the restriction of nozzle 62 and/or orifice 68. When the GTE reaches approximately 75% of its rated load speed, the starter engine may be shut-off and valve 64 may be closed, such that air assist is no longer provided. At that point, due to the operation of compressor system 10, the compressed air in enclosure 72 may be of sufficient pressure to atomize pilot liquid fuel without use of air assist.

In one embodiment, air assist may be supplied to the GTE beginning (e.g. at approximately 20% of rated load speed) at a rate of approximately 18 pounds-mass per hour. And, the flow supplied air assist may gradually be increased until air assist is terminated (e.g. at approximately 75% of rated load speed). At the time of termination, air assist may be supplied at a rate of approximately 25 pounds mass per hour. It may be noted that this embodiment may result in a substantially lower T5 spread when compared to the T5 spread of GTEs that do not have a combined air assist and pilot gaseous fuel circuit. T5 spread is generally known in the art as a start-up characteristic of GTEs that indicates the variability of temperature distribution around different parts of the engine as a function of time. Generally, a lower T5 spread is considered to be desirable.

In another embodiment, air assist may be supplied to the GTE beginning (e.g., at approximately 20% of rated load speed) at a rate of approximately 10 pounds-mass per hour. And, the flow supplied air assist may gradually be increased until air assist is terminated (e.g. at approximately 75% of rated load speed). At the time of termination, air assist may be supplied at a rate of approximately 19 pounds mass per hour. This embodiment may result in further improved T5 spread characteristics vis-a-vis the embodiment described in the paragraph. above, the T5 spread peaking a lower temperature and settling faster.

That the decreased flow of air assist results in better T5 spread characteristics may indicate that that embodiments work effectively—or even better with a reduced air assist flow. Thus, each GTE with a combined pilot gaseous fuel/air assist circuit causing an ejector effect may have optimal air assist flow rates, which may be determined by trial and error based upon startup characteristics such as T5 spread. GTE startup at such an optimal air assist flow rates may be characterized by a minimized T5 spread. throughout the startup process.

It will be apparent to those skilled in the art that various modifications and variations can be made to the disclosed methods, GTEs, and fuel injectors. Other embodiments will be apparent to those skilled in the art from consideration of the specification and practice of the disclosed dual fuel injector with combined air assist and pilot gaseous fuel circuit. It is intended that the specification and examples be considered as exemplary only, with a true scope being indicated by the following claims and their equivalents.

The invention claimed is:

1. A turbine engine, comprising:
a combined pilot gaseous fuel and air assist manifold;
an air assist source coupled to the combined pilot gaseous fuel and air assist manifold;
a pilot gaseous fuel source coupled to the combined pilot gaseous fuel and air assist manifold;
a compressor system, the compressor system configured to discharge compressed gas into an enclosure; and
a plurality of fuel injectors, wherein each fuel injector comprises:
a pilot injector barrel,
a combined pilot gaseous fuel and air assist tube, the tube connected to the combined pilot gaseous fuel and air assist manifold, terminating in a restricting outlet, and configured to direct a fluid supplied to the combined pilot gaseous fuel and air assist tube into a first end of the pilot injector barrel, the restricting outlet being positioned with respect to the pilot injector barrel to draw additional gas from the enclosure into the first end of the pilot injector barrel,
a pilot liquid fuel circuit configured to distribute pilot liquid fuel at a second end of the pilot injector barrel;
a first valve positioned between the air assist source and the combined pilot gaseous fuel and air assist manifold;
a second valve positioned between the pilot gaseous fuel source and the combined pilot gaseous fuel and air assist manifold; and
a controller configured to adjust the first valve and the second valve.

2. The turbine engine of claim 1, wherein the controller is configured to adjust at least one of the first and second valves to be in closed position during turbine operation.

3. The turbine engine of claim 2, wherein the controller is configured to open the second valve during turbine engine operation on gaseous fuel and open the first valve during turbine engine startup operation on liquid fuel.

4. The turbine engine of claim 3, wherein the controller is configured to open the first valve after the turbine engine exceeds approximately 20% of a rated load speed.

5. The turbine engine of claim 3, wherein the controller is configured to dose the first valve after the turbine engine exceeds approximately 75% of a rated load speed.

6. The turbine engine of claim 3, wherein the controller is configured to adjust the first valve to limit a flow of the fluid supplied to the combined pilot gaseous fuel and air assist tube of each fuel injector to a rate of approximately 25 pounds mass per hour.

7. The turbine engine of claim 3, wherein the controller is configured to adjust the first valve to limit a flow of the fluid supplied to the combined pilot gaseous fuel and air assist tube of each fuel injector to a rate of approximately 19 pounds mass per hour.

8. The turbine engine of claim 1, wherein the restricting outlet of each fuel injector comprises an orifice.

9. The turbine engine of claim 1, wherein the restricting outlet of each fuel injector comprises a nozzle.

* * * * *